United States Patent [19]

Platteschorre

[11] Patent Number: 4,995,785

[45] Date of Patent: Feb. 26, 1991

[54] EGG CARTON STACKING-LOADING DEVICE AND METHOD

[76] Inventor: Kornelis Platteschorre, 4273 Mohave Ct., Grandville, Mich. 49418

[21] Appl. No.: 230,749

[22] Filed: Aug. 10, 1988

Related U.S. Application Data

[62] Division of Ser. No. 907,225, Sep. 12, 1986, Pat. No. 4,787,799.

[51] Int. Cl.⁵ .............................................. B65G 57/00
[52] U.S. Cl. ............................. 414/790.3; 414/790.5; 414/794.3; 414/331; 414/661; 198/468.6
[58] Field of Search ............... 414/790.3, 790.5, 794.3, 414/280, 331, 661, 400; 198/468.6

[56] References Cited

U.S. PATENT DOCUMENTS

| | | |
|---|---|---|
| 1,569,032 | 1/1926 | Reichel . |
| 2,256,453 | 9/1941 | Bomar . |
| 2,412,155 | 12/1946 | Jessen . |
| 2,699,264 | 1/1955 | Bruce . |
| 2,768,756 | 10/1956 | Horman .................... 414/794.3 X |
| 2,924,051 | 2/1960 | More . |
| 3,013,369 | 12/1961 | Wilson . |
| 3,037,645 | 6/1962 | Simpkins . |
| 3,107,013 | 10/1963 | Euwe .................... 414/790.3 |
| 3,157,301 | 11/1964 | McWilliams .................... 414/794.3 |
| 3,442,400 | 5/1969 | Roth . |
| 3,466,839 | 9/1969 | Temple . |
| 3,501,036 | 3/1970 | Calistrat . |
| 3,533,496 | 10/1970 | Atwood . |
| 3,570,209 | 3/1971 | Salwasser . |
| 3,594,977 | 7/1971 | Grasvoll .................... 414/744.3 X |
| 3,637,095 | 1/1972 | Kampfer . |
| 3,640,407 | 2/1972 | Anastasio . |
| 3,763,625 | 10/1973 | Slavin . |
| 3,858,732 | 1/1975 | Kemper . |
| 3,895,574 | 7/1975 | Nyborg . |
| 4,032,027 | 6/1977 | Lindberg . |
| 4,042,125 | 8/1977 | Falkinger et al. . |
| 4,043,460 | 8/1977 | Steele . |
| 4,173,910 | 11/1979 | Lineberry . |
| 4,217,074 | 8/1980 | Leasor et al. .................... 414/661 X |
| 4,231,697 | 11/1980 | Franz . |
| 4,352,617 | 10/1982 | Sakai . |
| 4,354,786 | 10/1982 | Spitler . |
| 4,579,501 | 4/1986 | Fox .................... 414/661 X |
| 4,634,333 | 1/1987 | Butterfly, Jr. et al. ......... 414/400 X |
| 4,679,379 | 7/1987 | Cassoli . |
| 4,727,370 | 4/1973 | Lassig . |

FOREIGN PATENT DOCUMENTS

| | | | |
|---|---|---|---|
| 0031218 | 2/1984 | Japan .................... | 414/794.3 |
| 1439434 | 5/1976 | United Kingdom . | |
| 2051722 | 1/1981 | United Kingdom ............. | 414/794.3 |

*Primary Examiner*—H. Grant Skaggs
*Assistant Examiner*—Boris Milef
*Attorney, Agent, or Firm*—Price, Heneveld, Cooper, De Witt & Litton

[57] ABSTRACT

An egg carton stacking and loading apparatus having a stacking assembly that adds subsequent cartons to the bottom of the stack. The apparatus includes a transfer assembly having a pair of upright panels that abut both sides of the carton stack during transfer in order to prevent inadvertent tipping of the stack. The transfer panels shift the carton stack onto a loading assembly, which carries the egg carton stack onto a storage surface. The loading assembly includes a support panel and a pusher panel which advance simultaneously, and thereafter the support panel is withdrawn while the position of the pusher panel is maintained.

33 Claims, 8 Drawing Sheets

EGG CARTON STACKING-LOADING DEVICE AND METHOD

This is a division of application Ser. No. 907,225, filed Sept. 12, 1986, now issued as U.S. Pat. No. 4,787,799, on Nov. 29, 1988.

BACKGROUND OF THE INVENTION

The present invention relates to a method and apparatus for the stacking and loading of filled egg cartons.

Presently, egg cartons filled with eggs are stacked and loaded into carts manually. The fragility of egg cartons, now typically made of foamed plastic material, and of the eggs they contain, create unique handling problems which have prevented the development of a practical egg carton stacking and loading device. One problem encountered in the stacking of fragile objects, such as egg cartons, is that the dropping of the carton onto the top of a stack may damage the cartons or the eggs in them.

One difficulty associated with the transfer of stacks of relatively small packages, such as egg cartons, is that these relatively small objects do not provide a stable base in the manner provided by larger objects such as lumber and the like. The transfer of stacked egg cartons therefore provides problems not experienced with larger or more stable stacked objects. For example, when a stack that is relatively tall compared, to its carton size is slid along a supporting surface, the stack is prone to tipping over.

Although a simple conveyor may be adequate for the transfer of certain stacked objects, other packages would require additional lateral support. For this reason, many carton stacks are shrink wrapped or palletized for transfer Unfortunately, this would drive up the cost of the eggs, and eggs are already a very competitive commodity.

Such difficulties have posed problems to the egg processing industry in the automation of handling operations for filled egg cartons. To date, a commercially successful automated egg carton stacker and loader has not been developed.

SUMMARY OF THE INVENTION

The device and related method of the present invention includes, in its broader aspects, one or more of the following features:

1. stacking egg cartons by adding cartons in layers to the bottom of the stack;
2. transferring the stack to a loading assembly by means of reciprocating, upright transfer panels; and
3. loading the stack onto a cart using one or both of the following:
   a. a tiltable support plate and pusher plate combination; and
   b. which is elevatable to accommodate loading the stack into the cart at different levels.

The device of the present invention stacks egg cartons by adding cartons in layers to the bottom of a stack which grows in height as additional cartons are added. The device then transfers the stacked egg cartons from the stacking region to a loading assembly in an adjacent transfer region. For this transfer one upright transfer panel is positioned against one side of the stack while another upright transfer panel is advanced across the transfer region to the opposite side of the stack. The two transfer panels are then shifted together in order to support both the front and rear sides of the stack while the cartons are slid onto the loading assembly. The carton stack is then moved from the transfer region to a storage region and deposited on a storage shelf. For this loading step, the device provides a bottom supporting panel and pusher panel that advance into the storage region. The supporting panel is then retracted while the pusher panel remains in place in order to slide the carton stack off the retracting support panel and onto the storage shelf.

These and other objects, features and advantages of the invention will be appreciated by those skilled in the art by reference to the specification and claims which follow and the drawings appended hereto.

DETAILED DESCRIPTION OF THE PREFERRED EMBODIMENTS

Figure 1:
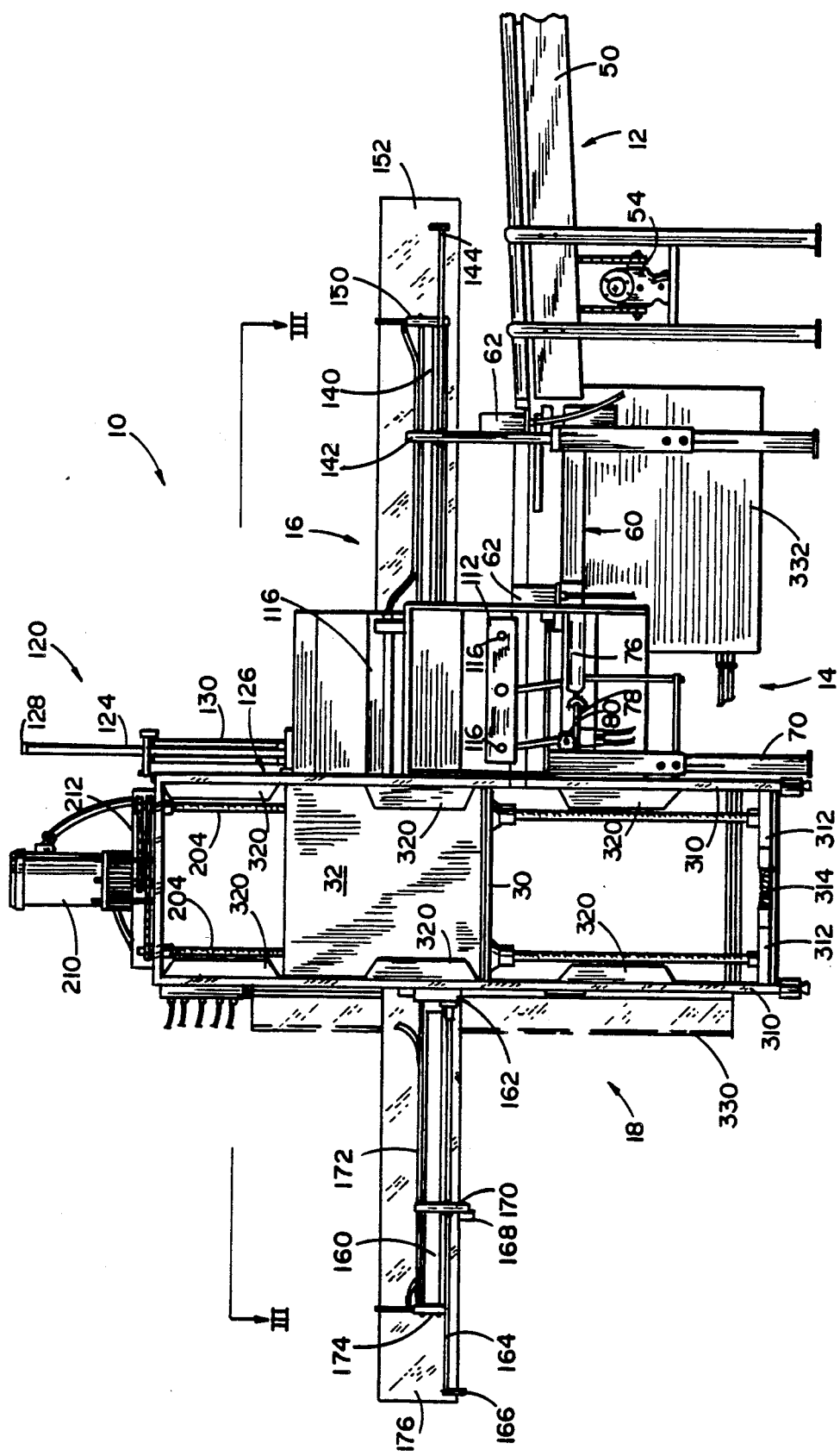
FIG. 1 is a front elevational view of an egg carton stacking and loading device embodying the invention.
Figure 2:
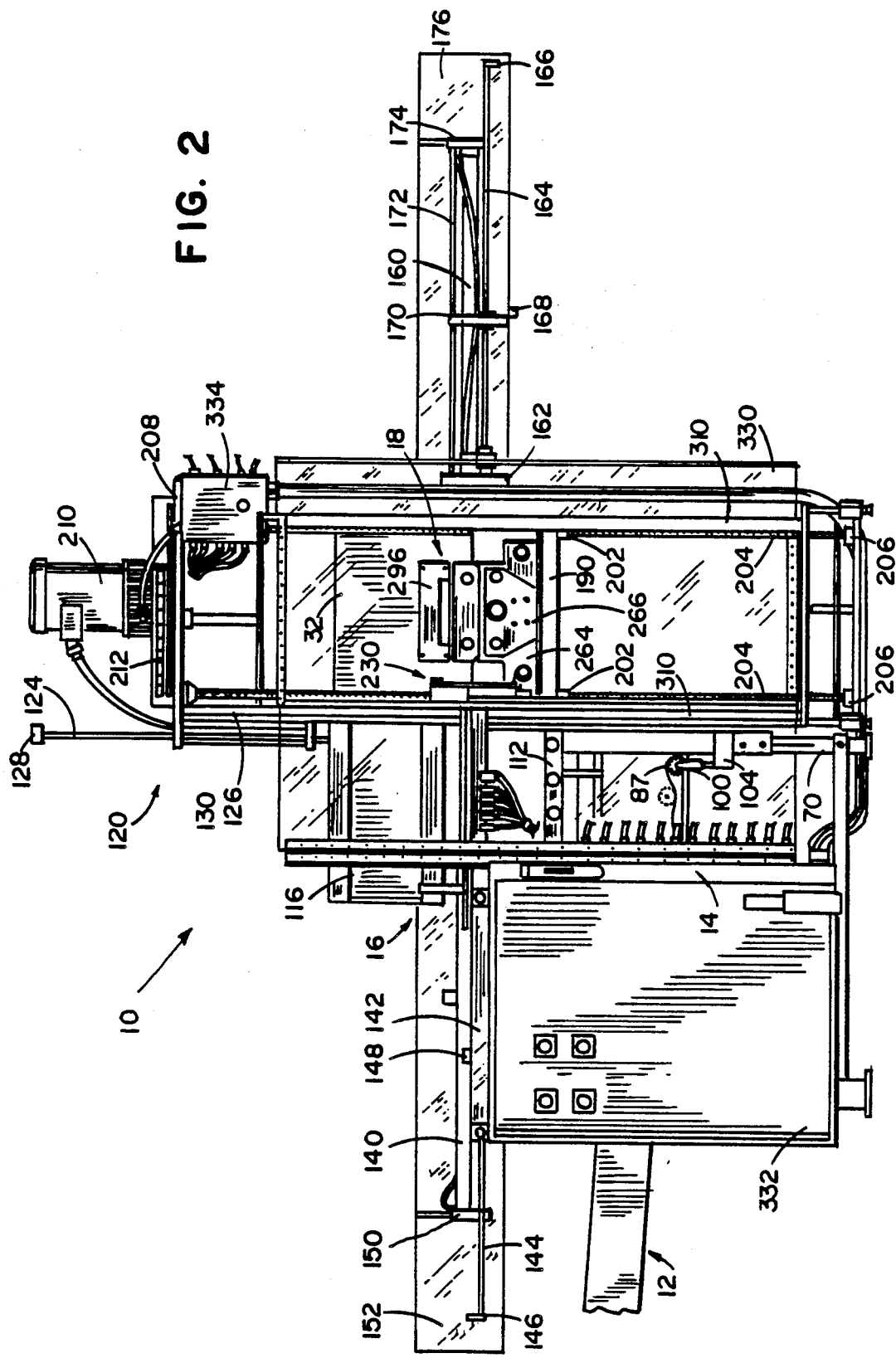
FIG. 2 is a rear elevational view of the device of FIG. 1.

The present invention is embodied in an egg carton stacking and loading device shown in preferred form in FIGS. 1 and 2 and referenced generally by the numeral 10. Device 10 includes an egg carton conveyor 12 that feeds into an egg carton stacking assembly 14. After the egg cartons have been stacked by stacking assembly 14, a transfer assembly 16 shifts the stack laterally onto a loading assembly 18. Loading assembly 18 then carries the carton stack in a direction generally normal to the shifting direction of transfer assembly 16 and deposits the stack on a storage surface.

As best shown in the schematic of FIGS. 13–16, stacking assembly 14 stacks egg cartons 20 by raising the cartons on a raisable conveyor section 22 to a set of raised holding elements or rails 24. Subsequent layers of egg cartons are added to the bottom of the stack. As best shown in FIGS. 17-19, transfer assembly 16 includes a pair of transfer panels or plates 26 and 28 that support the carton stack as it is being slid laterally onto loading assembly 18. Transfer panel 26 is located in a retracted position alongside the carton stack opposite loading assembly 18. Transfer panel 28 is located in a retracted condition on the side of loading assembly 18 removed from stacking assembly 14. Transfer panel 28 is therefore advanced across loading assembly 18 until it is brought adjacent the stack of egg cartons, and transfer panels 26, 28 are then simultaneously shifted in order to slide the carton stack onto loading assembly 18. As shown in FIGS. 20-23, loading assembly 18 includes a support panel or plate 30 and a pusher panel 32 that is generally normal to panel 30. Panels 30 and 32 are advanced together out over a storage surface, such as a cart 34, so that the carton stack is disposed over the storage surface. Support panel 30 is pivoted so that it extends at a downward slope from pusher panel 32, and is then retracted while pusher panel 32 remains in position. Support panel 30 is thus slid from beneath egg cartons 20.

STACKING ASSEMBLY

Figure 3:
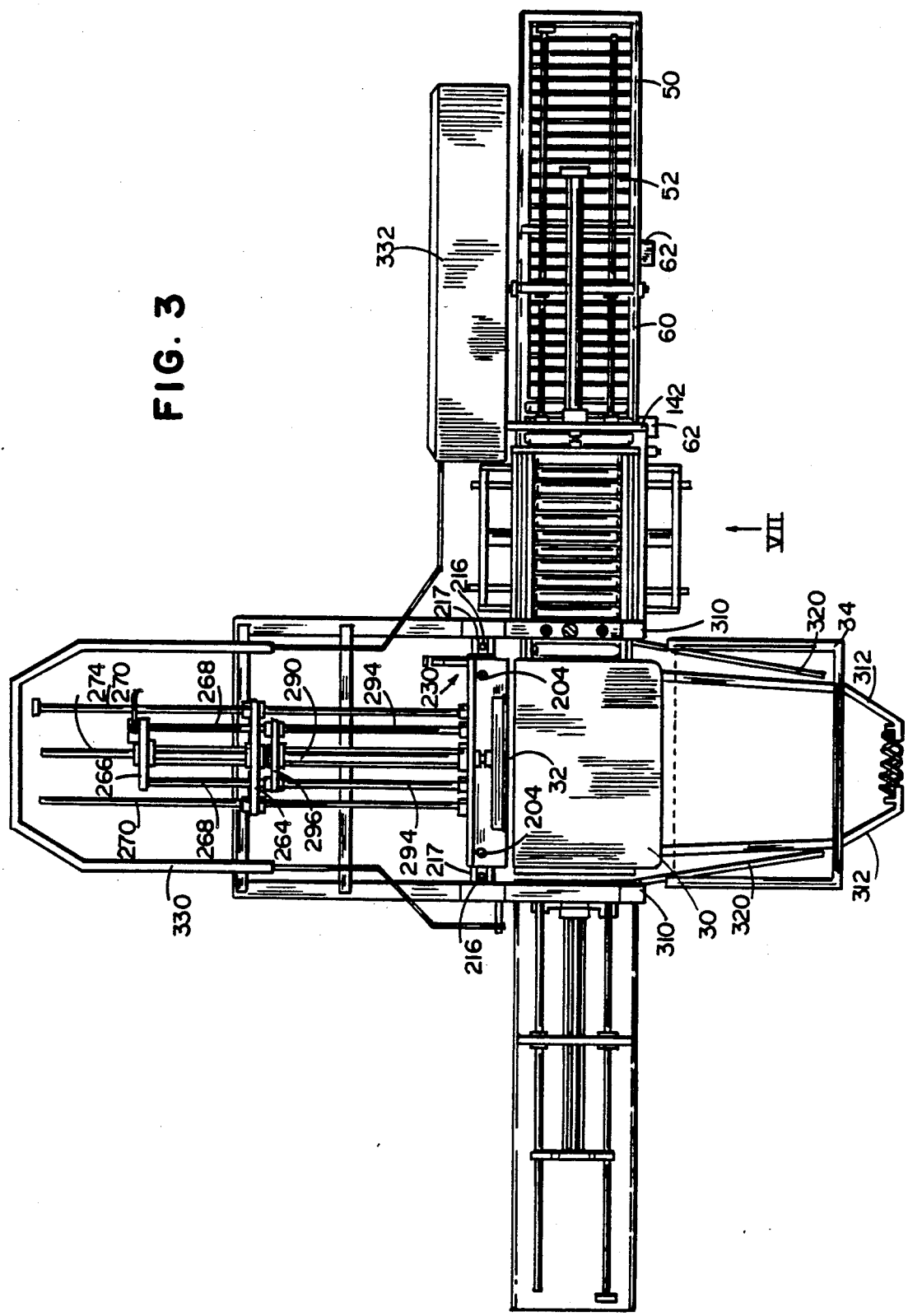
FIG. 3 is a sectional plan view taken along plane III—III of FIG. 1.

As best shown in FIG. 3, conveyor 12 includes a frame 50 that supports conveyor rollers 52. A drive motor 54 (FIG. 1) drives rollers 52 in order to advance egg cartons 20 toward stacking assembly 14. Conveyor frame 50 includes appropriate supporting legs and side guards that prevent cartons 20 from falling off conveyor 12 in a conventional manner.

Conveyor 12 includes a holding section 60 that provides a staging area for the controlled feed of egg cartons into stacking assembly 14. Holding section 60 is a length substantially equal to the length of raisable conveyor section 22 (FIG. 3) so that the capacity of holding section 60 equals that of raisable conveyor section 22. A spaced pair of photoelectric cells 62 located at opposite ends of holding section 60 determine when holding section 60 has been filled to capacity with cartons 20. The rear photoelectric cell 62 includes a timer switch that prevents the switch from triggering until the beam has been blocked a predetermined interval. An initial carton or cartons may therefore pass the rear cell 62 without tripping the associated switch. Egg cartons 20 conveyed down conveyor 12 are forced onto holding section 60 by abutment with subsequent egg cartons traveling along conveyor 20. When photoelectric cells 62 determine that holding section 60 is filled, drive motor 54 for conveyor 12 is shut off. In this manner holding section 60 is tightly packed even though egg cartons 20 may be randomly spaced as they are conveyed along conveyor 12. When raisable conveyor section 22 is lowered to a loading position, a separate drive motor (not shown) for holding section 60 advances the closely packed egg cartons 20 onto raisable conveyor section 22.

Figure 8:
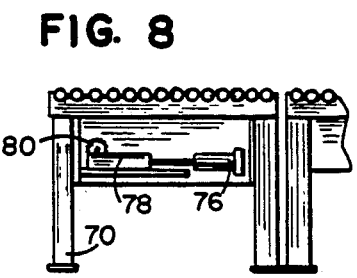
FIG. 8 is a front elevational view of a raisable conveyor section used in the stacking assembly of FIG. 7.
Figure 10:
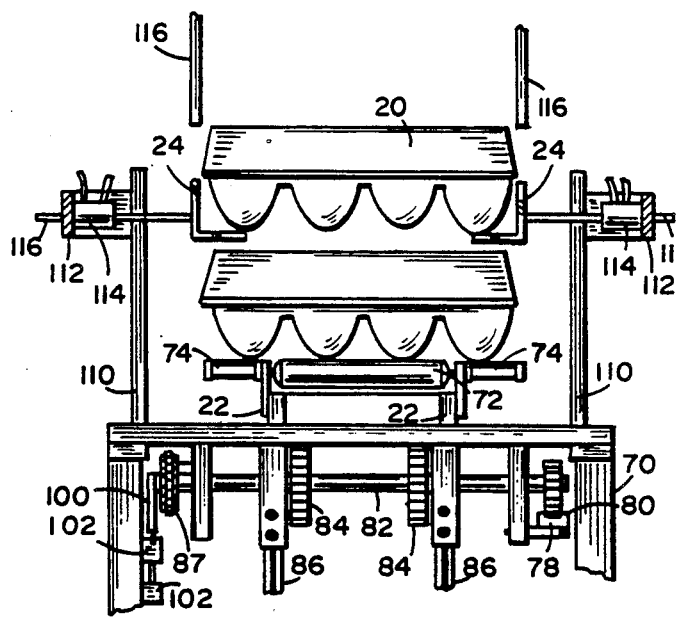
FIG. 10 is a fragmentary, elevational end view of the stacking assembly shown in FIG. 7.

As shown in, FIGS. 8 and 10, raisable conveyor section 22 is supported on a frame 70 having a sufficient number of support legs and cross pieces to support the weight of stacked egg cartons 20. Raisable conveyor section 22 has a rectangular box-shaped base on which a series of shortened conveyor rollers 72 are mounted. Conveyor rollers 72 are shorter than conveyor rollers 52, so that egg cartons 20 overhang both edges of raisable conveyor section 22 (FIG. 10). A skid rail 74 extends along either side of raisable conveyor section 22.

Figure 9:
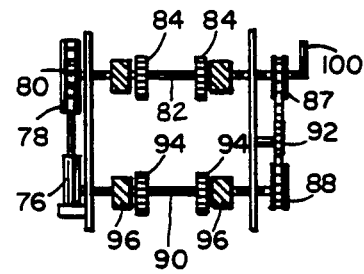
FIG. 9 is a top plan view of the lift apparatus for the raisable conveyor section shown in FIG. 8.

The drive mechanism for the raising and lowering of raisable conveyor section 22 is shown in FIGS. 8-10. This drive mechanism includes a lift cylinder 76 mounted on one side of frame 70. Drive cylinder 76 preferably is a suitable pneumatic cylinder and piston having a conventional one hundred psi. fluid pressure source. Alternatively, a hydraulic cylinder may be used. One such suitable drive cylinder is distributed by Miller Fluid and Power Co. of Chicago, Ill. Drive cylinder 76 linearly reciprocates a gear rack 78 that meshes with drive gear 80 (FIG. 8). As shown in FIGS. 9 and 10, drive gear 80 is mounted on an axle 82 having suitable bushings or bearings. Directly beneath raisable conveyor section 22 on axle 82 are a pair of pinion gears 84. Pinions 84 mesh with a pair of vertical gear racks 86, that in turn are connected to the underside of raisable conveyor section 22. A transmission sprocket 87 is located on the end of axle 82 opposite drive gear 80. Sprocket 87 provides a chain drive for a rear sprocket 88 which is mounted on a rear axle 90 (FIG. 9) with an idler sprocket 92 located therebetween. Mounted on axle 90 are another pair of pinion gears 94 that mesh with a pair of vertical gear racks 96. As cylinder 76 reciprocates gear 80, pinions 84 and 94 raise and lower vertical racks 86 and 96 and thus raise and lower raisable conveyor section 22.

Figures 11, 12:
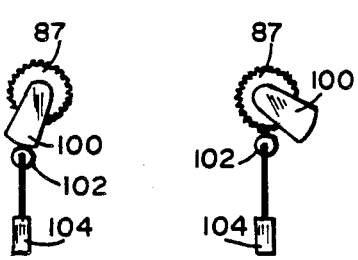
FIG. 11 is a schematic view of a cam follower switch used in the stacking assembly of FIG. 10, shown in an engaged or holding element converged position.
FIG. 12 is another view of the cam follower switch assembly of FIG. 11, shown in a disengaged or diverged holding position.

A cammed lobe 100 (FIGS. 9-12) is mounted on transmission sprocket 87 and is used to control holding elements 24. A cam follower 102 is connected to a switch 104 mounted on frame 70. As shown in FIG. 11, as raisable conveyor section 22 is raised, transmission sprocket 87 turns lobe 100 out of contact with cam follower 102 (FIGS. 11-12). As cam follower 102 raises, switch 104 causes holding elements 24 to separate as described more fully herein. A timer in the circuit with switch 104 causes loading elements 24 to converge in order to lift a layer of egg cartons off raisable conveyor section 22 as herein described.

Holding rails 24 have a generally L-shaped cross section (FIG. 10) and extend the length of raisable conveyor section 22. Holding rails 24 are spaced above raisable conveyor section 22 when in the lowered condition so that an egg carton 20 may be readily conveyed beneath holding elements 24. Each holding rail 24 is mounted on vertical bars 110 that form a part of frame 70. A horizontal bar 112 coupled to vertical bars 110 forms a base for a converging cylinder 114, the piston of which is connected to holding rail 24. A pair of guide rods 116 on either side of cylinder 114 maintain the alignment of holding rail 24 as it is reciprocated. Guide rods 116 pass through suitable bushings or bearings in horizontal bar 112 and vertical bars 110. Converging cylinder 114 preferably is a pneumatic cylinder having a conventional one hundred psi. fluid pressure source. Alternatively, cylinder 114 may be a hydraulic cylinder. One such suitable cylinder is distributed by Miller Fluid and Power Co. of Chicago, Ill.

In a converged position holding rails 24 are located above skid plates 74 as shown in FIG. 10. Even when converged, raisable conveyor section 22 is provided with clearance to pass between the cantilevered ends of holding rails 24. When diverged, holding rails 24 provide sufficient clearance for the passage of an egg carton 20 seated on top of raisable conveyor section 22. A pair of side support panels 116 are mounted on frame 70 above holding rails 24. Side support panels 116 are generally vertical rectangular panels having an outwardly flared upper edge. Side support panels 116 provide lateral support for a carton stack, and combine with transfer panel 26 and a gate mechanism 120 (FIG. 1) disposed between stacking assembly 14 and loading assembly 18 to define a stack containing enclosure above holding rails 24.

Gate mechanism 120 (FIGS. 1 and 2) separates the stacking region of stacking assembly 14 from the transfer region of retracted loading assembly 18. Gate mechanism 120 includes a pair of vertical rods 124 that are mounted on a support frame 126 (FIG. 2). Vertical rods are joined by a horizontal bar 128 that is used to raise and lower rods 124. An appropriate raising cylinder 130 is mounted on support frame 126 with its piston connected to horizontal bar 128. Piston cylinder 130 preferably is an appropriate pneumatic cylinder having a conventional one hundred psi. fluid pressure supply. Alternatively, cylinder 130 may be a hydraulic cylinder. One suitable piston cylinder 130 for gate mechanism 120 is distributed by Miller Fluid and Power Co. of Chicago, Ill. Piston cylinder 130 has a stroke sufficient to raise vertical rods 124 to clear the carton stack passing beneath their depending ends.

To commence the bottom stacking process of stacking assembly 14, raisable conveyor section 22 is lowered to its at-rest position (FIG. 10). Conveyor 12 transports cartons until photoelectric cells 62 determine that holding section 60 is filled to capacity. Holding section 60 is advanced a predetermined amount in order to transfer egg cartons 20 onto raisable conveyor section 22. When the leading cell 62 senses that cartons 20 have cleared holding section 60, drive cylinder 76 is activated in order to raise conveyor section 22. Cam lobe 100 trips switch 104 at a predetermined stage of the raising, causing holding elements 24 to diverge and permit the passage of raisable conveyor section 22 with a first layer of egg cartons. After a predetermined elapsed time, cylinders 114 converge holding elements 24 and raisable conveyor section 22 lowers. Holding rails 24 support the overhanging edges of egg cartons 20. Raisable conveyor section 22 is filled with a subsequent layer of egg cartons and raises the subsequent carton layer into contact with the previous carton layer as holding elements 24 diverge. In this manner, subsequent carton layers are added to the bottom of the carton stack. The stack is laterally supported between side support panels 116, transfer panel 26 and vertical rods 124. A counter circuit counts the number of cycles of raisable conveyor section 22, thus determining when the required stack height has been reached and activates transfer assembly 16.

TRANSFER ASSEMBLY

As shown in FIG. 3, transfer assembly 16 includes aligned transfer panels, 26 and 28. Transfer panel 26 has a retracted or at-rest position located at the trailing side of raisable conveyor section 22 and holding rails 24. Transfer panel 26 is thus positioned on the side of the stacking region opposite loading assembly 18. Transfer panel 28 has a retracted or at-rest position spaced across the transfer region from stacking assembly 14.

Transfer panel 26 is a flat rectangular plate having a height approximately equal to the height of the carton stack to be transferred. Transfer panel 26 is reciprocated by a cylinder and piston 140 mounted on a frame 142. Cylinder and piston 140 are a pneumatic cylinder having a suitable one hundred psi. fluid pressure source.

Alternatively, cylinder 140 may be a hydraulic cylinder One suitable cylinder 140 is distributed by Miller Fluid and Power Co. of Chicago, Ill. Cylinder 140 has a stroke length sufficient to clear raisable conveyor section 22. A pair of guide rods 144 pass through appropriate bushings or bearings on frame 142 and maintain the alignment of transfer panel 26. One guide rod 144 has a stop plate 146 mounted on its projecting free end. A limit switch 148 is mounted on frame 142 at a position to contact stop plate 146 when cylinder 140 has moved transfer panel 26 to the fully advanced position. Limit switch 148 triggers the retraction of cylinder 140 to the at-rest position. A rear plate 150 on cylinder 140 assists frame 142 in the mounting of a transparent plastic protective housing 152. Protective housing 152 functions as a shield to prevent persons operating device 10 from inadvertently becoming entangled in the moving elements.

Transfer panel 28 is advanced and retracted by a cylinder and piston 160. Cylinder and piston 160 are also a suitable pneumatic or hydraulic cylinder having a conventional fluid pressure source similar to cylinder 140. Cylinder 140 is mounted on a horizontal beam 162 on support frame 126. A pair of guide rods 164 slidably received through suitable bushings or bearings on beam 162 maintain the alignment of transfer panel 28. A stop plate 166 is located on the projecting end of one guide rod 164. A limit switch 168 is mounted on a mid-panel 170 that is in turn secured to cylinder 140. Mid-panel 170 is located such that stop plate 166 contacts limit switch 168 when cylinder 140 fully advances transfer panel 28. When fully advanced, transfer panel 28 is located adjacent the forward side of raisable conveyor section 22, between the carton stacking region of device 10 and the transfer region. Since cylinder 140 is cantilevered out from horizontal beam 162, a pair of fixed support rods 172 extend from beam 162 to a rear plate 174 on cylinder 140. Support rods 172 are also secured to mid-panel 170 so that support rods 172 provide cantilevered support at several points along the length of cylinder 140. Rear plate 174 assists frame 126 in the mounting of a transparent protective housing 176 similar to protective housing 152.

Figure 7:
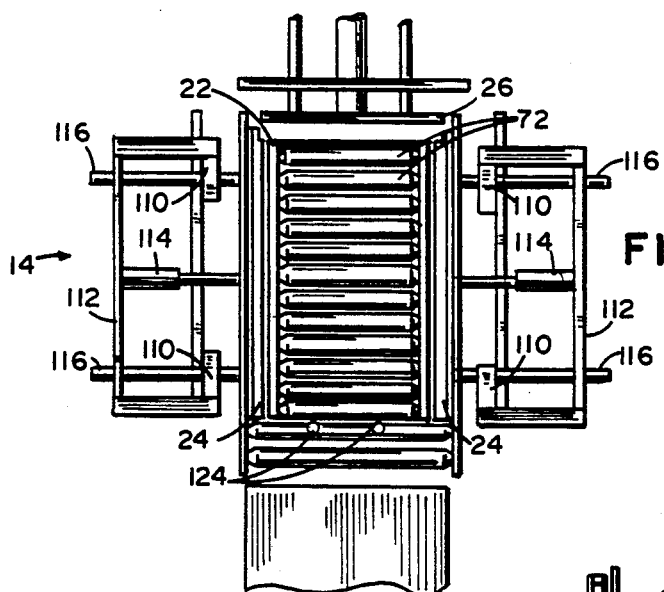
FIG. 7 is a top plan view of the stacking assembly taken in the region of Arrow VII in FIG. 3.

In operation, when the counter of stacking assembly 14 determines that an appropriate stack height has been reached, gate mechanism 120 is opened raising vertical rods 124. Cylinder 160 advances transfer panel 28 across loading assembly 18 to the stacked cartons on stacking assembly 14. When limit switch 168 is contacted by stop plate 166, cylinder 140 advances transfer panel 26 simultaneously with the retraction of transfer panel 28. Transfer panel 26 therefore pushes the carton stack along holding elements 25 and across a short intermediate conveyor section 180 (FIG. 7) that bridges holding elements 24 and support panel 30. Transfer panel 28 provides forward support for the stack a it is being pushed along the various supporting surfaces. When stop plate 146 contacts limit switch 148, cylinder 140 retracts transfer panel 26 and loading assembly 18 is activated.

LOADING ASSEMBLY

Loading assembly 18 includes support panel 30 and pusher panel 32 that are located in a retracted or at-rest position in a transfer region laterally aligned with stacking assembly 14 (FIG. 3). In addition to advancing panels 30 and 32 in order to carry a carton stack out over a cart 34, loading assembly 18 also raises and lowers panels 30 and 32 in order to accommodate different shelf heights. Panels 30 and 32 are mounted on a vertically adjustable carriage formed by a horizontal carriage bar 190 (FIG. 6) and side carriage bars 200. Secured to the underside of horizontal carriage bar 190 are a spaced pair of threaded sleeves 202. A spaced pair of threaded vertical adjustment rods 204 (FIGS. 2, 6) are received through sleeves 202 and are rotatably mounted on support frame 126. Threaded rods 204 are mounted in appropriate bearings 206 at the base of support frame 126, and in similar bearings on an upper frame plate 208. A vertical adjustment drive motor 210 (FIG. 2) is mounted on frame plate 208. A gear train 212 is coupled to motor 210 and threaded rods 204, and includes conventional sprockets and chain. As drive motor 210 turns threaded rods 204, carriage bar 190 raises and lowers in response.

Figure 6:
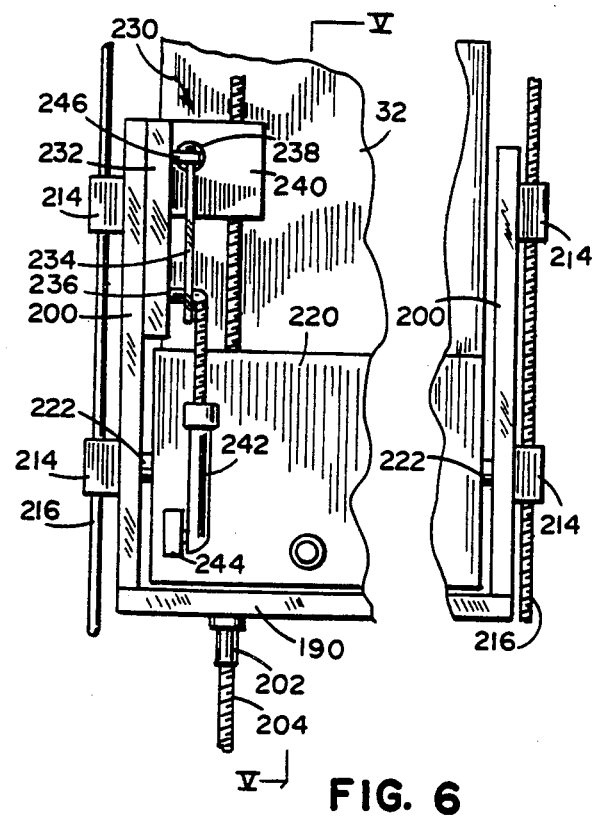
FIG. 6 is a fragmentary, rear view of the loading assembly pivot mechanism shown in FIG. 5.

Extending from the outer side of each side carriage bar 220 are a pair of vertically spaced pair of guide sleeves 214 (FIG. 6). A pair of vertical guide rods 216 are received through guide sleeves 214. Guide rods 216 are fixedly mounted on support frame 126 within a pair of rear support legs 217. Guide rods 216 maintain the alignment of panels 26 and 28 during vertical adjustment. Guide sleeves 214 include suitable bushings that allow side carriage bars 200 to smoothly slide along guide rods 216. Limit switches (not shown) are vertically spaced at three levels on frame 126 so as to align the vertical position of carriage bar 218 with storage shelves of different heights.

Figure 5:
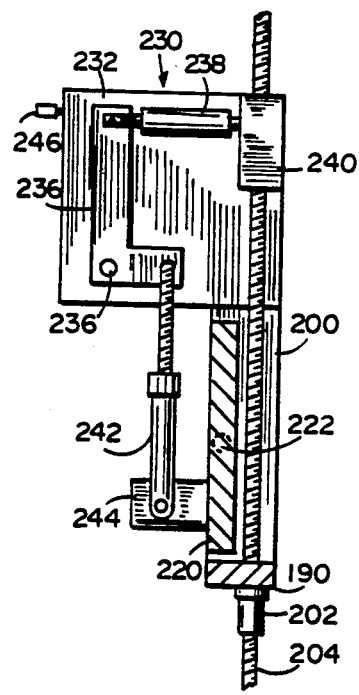
FIG. 5 is a fragmentary, sectional view of the loading assembly pivot mechanism taken along plane V—V in FIG. 6.

A pivoting base plate 220 (FIGS. 5-6) provides a mount for both support panel 30 and pusher panel 32. Base plate 220 is pivotally mounted between side carriage bars 200 in order to pivot about a horizontal axis on a pair of pivot joints 222. Pivoting base plate 220 is used to tilt support panel 30 between the loaded carrying position and its downwardly sloping unloading position. A pivoting adjustment mechanism 230 is mounted on one side carriage bar 200 (FIGS. 5-6). Pivot adjustment mechanism 230 includes a square plate 232 secured to side carriage bar 220. An L-shaped actuator bar 234 is pivotally mounted on square plate 232 by a pivot 236. An actuator pneumatic cylinder and piston 238 is mounted on plate 232 by a mounting block 240 and is coupled to the upper leg of L-shaped actuator bar 234 (FIG. 5). An adjustable linkage 242 is coupled to the short horizontal leg of actuator bar 234. Linkage 242 is coupled to an arm 244 that projects from the rear of base plate 220. Adjustable linkage 242 allows the spacing between actuator bar 234 and arm 244 to be varied, thus allowing for the adjustment of the at-rest angle of base plate 220. A limit switch 246 is mounted on square plate 232. Limit switch 246 is positioned to be contacted by the upper end of actuator bar 234 when cylinder 238 pivots the top of actuator bar 234 rearwardly away from threaded rod 204. As the top of actuator bar 234 is pivoted, linkage 242 is raised, thus causing arm 244 to raise. Base plate 220 is pivoted about joints 222 causing support panel 30 to tilt downwardly as described herein. Limit switch 246 is contacted by actuator bar 234 when support panel 30 has been tilted to the downwardly angled unloading position.

Figure 4:
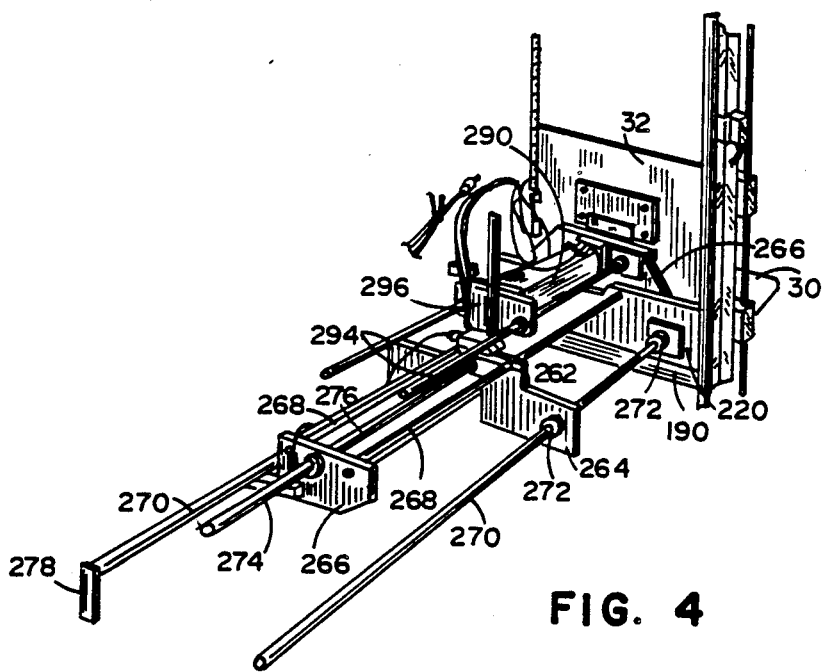
FIG. 4 is a rear perspective view of the loading assembly advancement mechanism of the device shown in FIG. 3.
Figure 24:
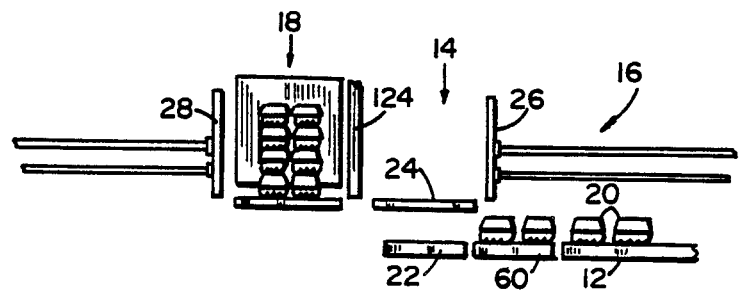
FIGS. 24 through 28 are schematic diagrams showing the process sequence followed by the loading assembly in depositing two different stacks of packages on a storage surface.

As shown in FIGS. 4 and 24, support panel 30 is connected to a front mounting panel 260. Front mounting panel 260 is reciprocated by a simultaneous advancing cylinder 262 mounted on pivoting base plate 220. The piston for lower simultaneous advancing cylinder 262 passes through an aperture in pivoting base plate 220 and is connected to front mounting panel 260. Cylinder 262 preferably is a pneumatic cylinder having an appropriate one hundred psi. fluid source. Alternatively, cylinder 262 may be a hydraulic cylinder. Secured to cylinder 262 are an intermediate support panel 264 and a rear support panel 266. A pair of fixed support rods 268 extend on either side and above cylinder 262. Fixed support rods 268 are fixedly secured to pivoting base plate 220, intermediate support panel 264 and rear support panel 266 to provide cantilevered support for cylinder 262 from base plate 220. A pair of lower guide rods 270 are connected to front mounting panel and extend along either side of cylinder 262. Lower guide rods 270 are slidably received through appropriate bushings 272 on both pivoting base plate 220 and intermediate support panel 264. Rear support panel 266 is an inverted generally triangularly shaped trapezoid that permits lower guide rods 270 to pass along either side. An upper guide rod 274 is connected to front mounting panel 260 and slidably extends through pivoting base plate 220, intermediate support panel 264 and rear support panel 266. A small guide tube 276 (FIG. 4) extends between intermediate support panel 264 and rear support panel 266. Upper guide rod 274 is slidably received through tubular guide section 276. When cylinder 262 fully advances front mounting panel 260 the projecting end of upper guide rod 274 passes completely through rear support panel 266. Tubular guide section 276 therefore prevents upper guide rod 274 from inadvertently misaligning with the mating aperture in rear support panel 266 during retraction.

A stop plate 278 is mounted on the rear projecting end of one lower guide rod 270. A full advance limit switch 280 (FIGS. 24-28) is mounted on intermediate support panel 264. A half advance limit switch 282 (FIGS. 4, 25, 27) is mounted on rear support panel 266. Intermediate support panel 264 is positioned so that stop plate 278 contacts limit switch 280 when cylinder 262 has fully advanced support panel 30. Half advance limit switch 282 provides a roller contact with the side of one lower guide rod 270. Half advance limit switch 282 senses when the free end of lower guide rod 270 passes limit switch 282. Limit switches 280 and 282 are used to selectively advance support panel 30 to two separate unloading positions.

Figure 25:
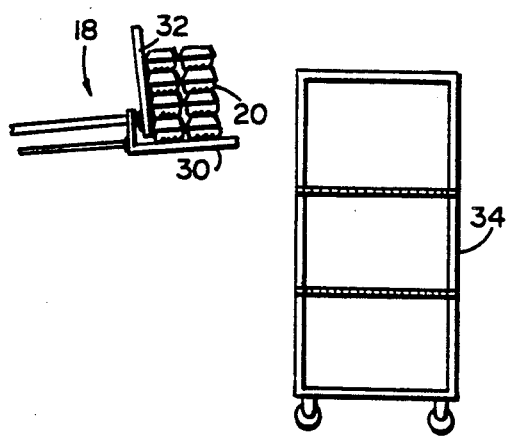

A pusher panel advancing cylinder 290 is mounted on front mounting panel 260 to extend rearwardly above pivoting base plate 220. Suitable cylinders for both cylinders 262 and 290 for example are distributed by Miller Fluid and Power Co. of Chicago, Ill. The piston of cylinder 290 is connected to pusher panel 32 and has a stroke sufficient to advance pusher panel 32 clear of support panel 30. A pair of upper guide rods 294 extend along either side of cylinder 290. Guide rods 294 are slidably received through suitable bushings on front mounting panel 260 and are secured to pusher panel 30. Guide rods 294 maintain the appropriate alignment of pusher panel 32 as it is advanced and retracted. An upper rear support panel 296 is mounted on the rear end of cylinder 290. Guide rods 294 are also slidably received through appropriate bushings on rear support panel 296. Rear support panel 296 is an inverted, generally triangular shaped trapezoid that depends to upper guide rod 274 (FIG. 25). As shown in FIG. 4, the upper edge of pivot base plate 220 is notched to permit rear support panel 296 to be advanced past plate 220. A limit switch 298 is positioned on intermediate support panel 264 in order to contact rear support panel 296. Limit switch 298 is contacted by rear support panel 296 when front mounting panel 260 is fully retracted by cylinder 262.

Figure 26:
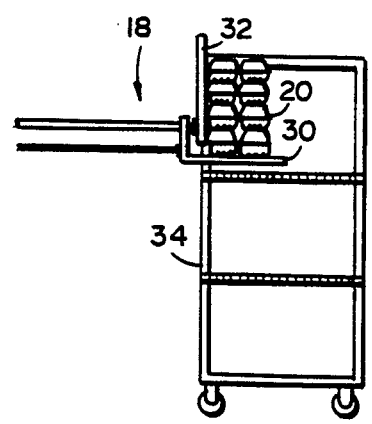

The sequential advancement and retraction of loading assembly 18 is shown in FIGS. 24–28. In the fully retracted or at-rest position both lower cylinder 262 and upper cylinder 290 are fully retracted as in FIG. 24. In order to advance a first stack of cartons supported on panels 30 and 32 over a storage surface, simultaneous advancing cylinder 272 advances front mounting panel 260 (FIG. 25) which carries support panel 30 and pusher panel 32. Advancing cylinder 262 is advanced until stop plate 278 contacts full advance limit switch 280. Upon the contact with full advance limit switch 280, cylinder 262 is retracted while cylinder 290 is simultaneously advanced (FIG. 26). Cylinder 262 retracts at the same rate as the rate of advancement of cylinder 290. This results in the independent retraction of support panel 30 while pusher panel 32 remains substantially stationary. Support panel 30 is coated with a Teflon brand coating that permits cartons 20 to smoothly slide off panel 20. Pusher panel 32 is advanced to the end of the stroke of upper cylinder 290, and is retracted to the original at-rest position (FIG. 24) when rear panel 296 contacts limit switch 298.

Figure 27:
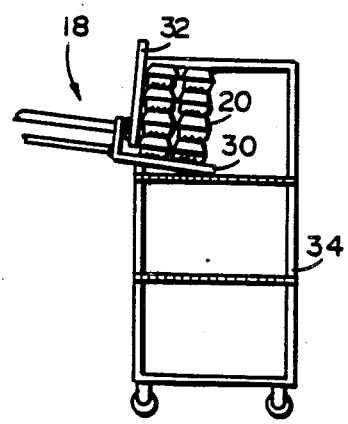
Figure 28:
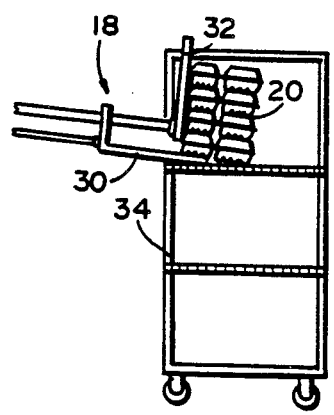

If a second stack of cartons are to be deposited on the same shelf adjacent the first stack, a counter circuit determines that on loading the second cycle, loading assembly 18 is advanced half the distance of the previous loading cycle. For this half advance, lower cylinder 262 advances both support panel 30 and pusher panel 32 until the free end of lower guide rod 270 clears half advance limit switch 282 (FIG. 27). Cylinder 262 then begins retracting front mounting panel 260 while cylinder 290 simultaneously advances pusher panel 32. This again results in the independent retraction of support panel 30 while pusher panel 32 remains substantially stationary (FIG. 28). When lower cylinder 262 is fully retracted, rear support panel 296 contacts limit switch 298. In response to limit switch 298, upper cylinder 290 again retracts pusher panel 32 in order to return the loading assembly 18 to the at-rest position shown in FIG. 24.

CART SECURING ASSEMBLY AND OPERATION

Support frame 126 includes front corner posts 310. At the base of front corner posts 310 are mounted a pair of cart holding arms 312 that project forward of front corner post 310. Spanning the gap between the forward ends of holding arms 312 is a compression spring 314. Holding arms 312 are pivotally mounted on support frame 126 so as to pivot in a horizontal plane. Compression spring 314 permits the resilient converging of the forward ends of holding arms 312. Holding arms 312 are configured in order to slide between the base wheels of a carton storage cart. Compression spring 314 forces holding arms 312 outwardly against the base of the cart in order to hold the cart in a storage position aligned with loading assembly 18.

Projecting forwardly of front corner posts 310 are six guide panels 320. Guide panels 320 are flexible metal panels that slide between the side bars or walls of a cart positioned on holding arms 312. Guide panels 320 are spaced to be received between three vertically spaced shelves on cart 34. Guide panels 320 provide side support for a stack of egg cartons being carried to the storage area on support panel 30.

A transparent plastic protective housing 330 is mounted on the rear of support frame 126. Housing 330 is hinged to open and permit access to the moving elements of loading assembly 18 and stacking assembly 14.

A control unit 332 (FIG. 2) is mounted adjacent housing 330. Control unit 332 is a computerized switching processor that coordinates the signals received from the various limit switches and photoelectric cells on device 10. Another switching unit 334 is mounted on one rear corner post 217 and is operably connected with vertical adjustment drive motor 210. Switching unit 334 is also connected to control unit 332.

Figure 13:
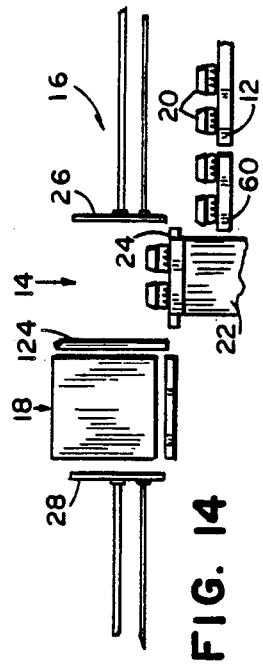
FIGS. 13 through 23 are schematic diagrams showing the process steps or method of stacking, transferring and then loading of egg cartons.
Figure 14:
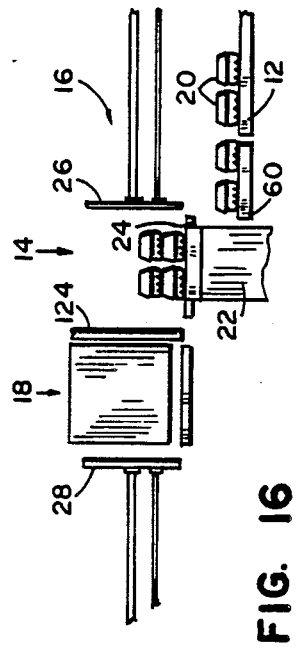
Figure 15:
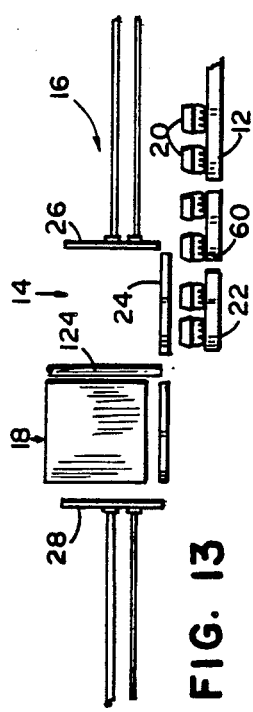
Figure 16:
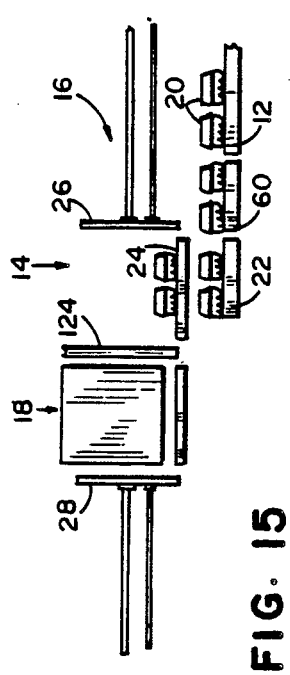
Figure 17:
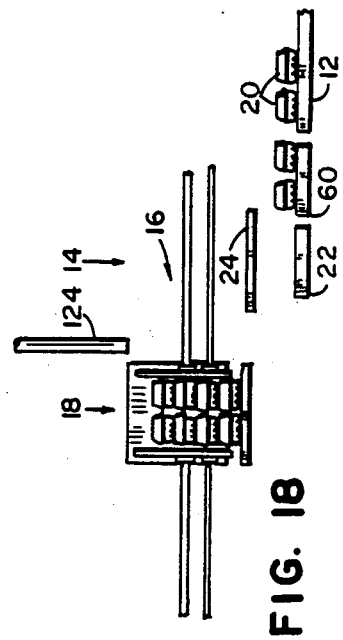
Figure 18:
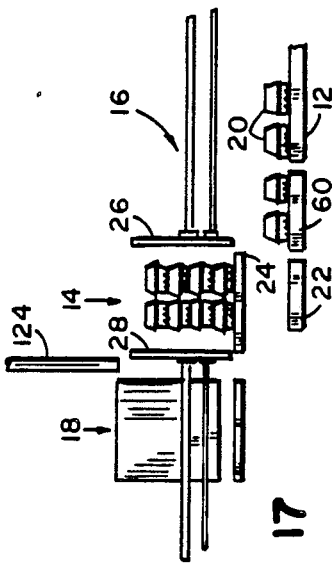
Figure 19:
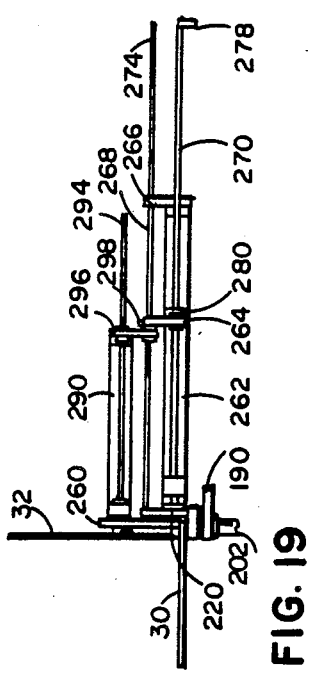

The method of stacking and loading egg cartons is shown schematically in FIGS. 13–23. Egg cartons 20 are conveyed along conveyor 12 until holding section 60 is filled to capacity. Egg cartons 20 are then conveyed by holding section 60 onto raisable conveyor section 22 (FIG. 13). Transfer assembly 16 and loading assembly 18 are both in the fully retracted or at-rest position. Raisable conveyor section 22 is raised (FIG. 14) until egg cartons 20 are elevated to a stacking height at holding elements 24. Holding elements 24 support the first layer of egg cartons and raisable conveyor section 22 is lowered for a subsequent layer of egg cartons (FIG. 15). Raisable conveyor section 22 is then raised until the subsequent layer contacts the first carton layer, and holding elements 24 are diverged and the stack of egg cartons is lifted (FIG. 16).

Figure 20:
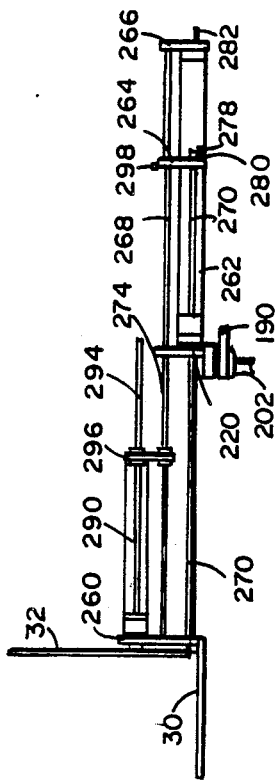

As shown in FIG. 17, once egg cartons 20 have been stacked on holding elements 24, transfer panel 28 is advanced across loading assembly 1B to the stacking area of stacking assembly 14. Transfer panel 26 is then advanced (FIG. 18) while transfer panel 28 is simultaneously retracted in order to slide the carton stack off holding elements 24 and onto support panel 30. Transfer panel 28 is then retracted (FIG. 19). FIG. 20 provides an end view of the loading assembly arrangement shown in FIG. 19. In the fully retracted position, support panel 30 with pusher panel 32 is pivoted so as to extend at an upward angle from pusher panel 32. The slope of support panel 30 may be adjusted using adjustable linkage 242. However, support panel 30 should be maintained at least at a horizontal orientation to prevent the egg carton stack from inadvertently spilling forward.

Figure 21:
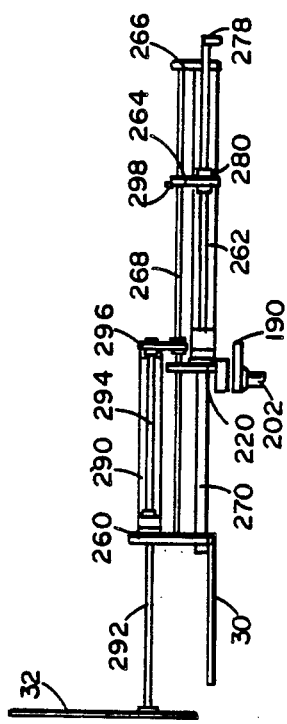
Figure 23:
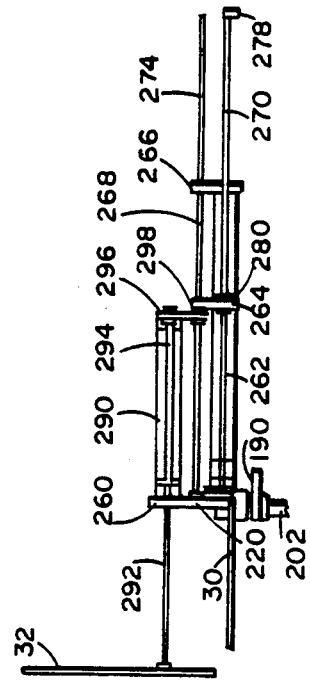

Loading assembly 18 then advances the carton stack out over the storage area on cart 34 (FIG. 21). Since the carton stack is being carried rather than slid along a supporting surface, it is unlikely that the stack will be inadvertently tipped forward. The upward slope of support panel 30 also protects against such inadvertent tipping.

Figure 22:
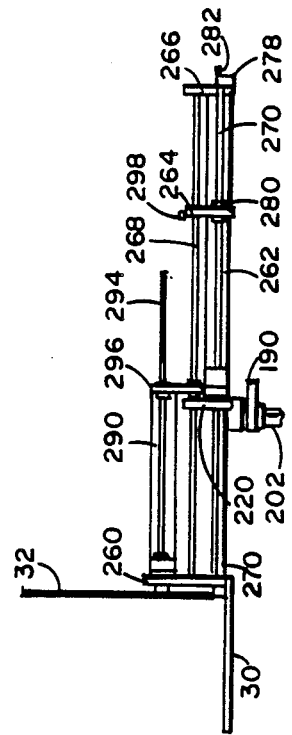

Support panel 30 is pivoted downwardly so that panel 30 slopes downwardly slightly from pusher panel 32 (FIG. 22). Support panel 30 is then independently retracted while pusher panel 32 is maintained in position so as to slide support panel 30 from beneath the carton stack. During unloading from loading assembly 18 the carton stack is normally adjacent the back wall or bars of cart 34, or alternatively is adjacent the previous carton stack. This prevents the inadvertent tipping of the carton stack. Further, the Teflon coating of support panel 30 causes the carton stack to slide smoothly off loading assembly 18.

On multiple shelf carts, loading assembly 18 is raised from the stack transfer position to the selected shelf height. Appropriate limit switches spaced along support frame 126 halt the raising or lowering of loading assembly 18 at preselected shelf heights in order to service a number of shelves. Another counter (not shown) counts the number of cycles of the loader and sounds an alarm (not shown) when cart 34 is filled in order to alert an operator for changing of carts.

With the egg carton stacking and loading device 10, egg cartons are automatically stacked and loaded onto a storage cart. Operators are not required for the activation of the different assemblies. Preferably device 10 is capable of stacking and loading at a rate of eighty dozen count cartons per minute. Although the preferred embodiment as described herein is used to stack egg cartons, the disclosed carton stacking and loading device 10 could be used for stacking other suitable packages. It is to be understood that the above is a description of the preferred embodiments and that one skilled in the art will recognize that various modifications or improvements may be made without departing from the spirit of the invention disclosed herein. The scope of protection afforded is to be determined by the claims which follow and the breadth of interpretation that the law allows.

The embodiments of the invention in which an exclusive property or privilege is claimed are defined as follows:

1. A loading device for stacked packages, comprising:
   a frame;
   a transfer region and a laterally aligned storage region;
   a stacking region laterally aligned with said transfer region;
   at least two transfer panels mounted on said frame to be selectively positionable on generally opposite sides of said stacking region, said transfer panels being movably mounted on said frame so as to selectively shift to generally opposite sides of said transfer region, whereby said transfer panels shift a stack of packages from said stacking region to said transfer region;
   a support panel and a pusher panel generally normal thereto laterally movably mounted on said frame, said support panel and said pusher panel having a retracted position disposed at said transfer region and an advanced position disposed at said storage region, said support panel having an unloading position in which said support panel slopes downwardly from said pusher panel and a loaded position pivoted from said unloading position to at least a horizontal position;
   means for simultaneously advancing said support panel and said pusher panel, and for independently retracting said support panel and said pusher panel; and
   means for pivoting said support panel between said loaded and unloading positions, whereby a stack of packages supported on said support panel are moved to said storage region by the simultaneous advance of said pusher panel and said support panel, said support panel is pivoted to said unloading position and independently withdrawn so that said pusher panel forces the stack of packages off said support panel.

2. A loading device as defined in claim 1, further comprising:
   means for raising and lowering said support panel and said pusher panel.

3. The loading device of claim 2, wherein:
   said simultaneously advancing and independently retracting means selectively advances said support panel and said pusher panel from said retracted position to at least two laterally spaced unloading positions, and selectively retracts said support panel and said pusher panel therefrom.

4. The loading device of claim 3, further comprising:
   a pair of spaced guide panels projecting from said frame along opposite sides of said storage region, said guide panels adapted for receipt in a shelved storage unit and disposed to provide side guide panels for stacked packages on said support panel as said support panel is advanced.

5. The loading device of claim 4, wherein:
   said pivoting means simultaneously pivots said pusher panel with said support panel.

6. The loading device of claim 2, wherein
   said raising and lowering means includes a carriage vertically movably mounted on said frame; and
   a pivoting base pivotally mounted on said carriage, said pusher panel and said support member coupled to said pivoting base.

7. The loading device of claim 6, wherein:
   said simultaneously advancing and independently retracting means includes a first advancement assembly mounted on said pivot base and coupled to said support panel, a second advancement assembly mounted on said support panel and coupled to said pusher panel, said support panel and said pusher panel being simultaneously advanced by the advancement of said first advancement assembly, and said support panel being independently retracted by the substantially simultaneous retraction of said first advancement assembly and advancement of said second advancement assembly such that said pusher panel remains generally stationary as said support panel retracts.

8. The loading device of claim 7, wherein:
   said first advancement assembly and said second advancement assembly comprise fluid cylinders and guide rods therefore.

9. The loading device of claim 8, wherein:
   said raising and lowering means includes a generally vertical threaded rod threadedly received through said carriage, and means for rotating said threaded rod.

10. The loading device of claim 2, wherein:
    said raising and lowering means includes a carriage movably mounted on said frame, said support panel and pusher panel coupled to said carriage, said raising and lowering means includes a generally vertical threaded rod threadedly received through said carriage, and means for rotating said threaded rod.

11. The loading device of claim 1, wherein:
    said simultaneously advancing and independently retracting means selectively advances said support panel and said pusher panel from said retracted position to at least two laterally spaced unloading positions, and selectively retracts said support panel and said pusher panel therefrom.

12. The loading device of claim 1, wherein:
    said pivoting means simultaneously pivots said pusher panel with said support panel.

13. The loading device of claim 1, wherein:
    said simultaneously advancing and independently retracting means includes a first advancement assembly mounted on said frame and coupled to said support panel, a second advancement assembly mounted on said support panel and coupled to said pusher panel, said support panel and said pusher panel being simultaneously advanced by the advancement of said first advancement assembly, and said support panel being independently retracted by the substantially simultaneous retraction of said first advancement assembly and advancement of said second advancement assembly such that said pusher panel remains generally stationary as said support panel retracts.

14. The loading device of claim 1, further comprising: means for stacking packages at said stacking region.

15. A loading device for stacked packages, comprising:
   a frame;
   a transfer region and a laterally aligned storage region;
   a stacking region laterally aligned with said transfer region generally normal to the alignment of said transfer region and said storage region;
   a first transfer panel mounted on said frame to be disposed at a side of said stacking region opposite said transfer region;
   means for advancing said first transfer panel toward said transfer region, whereby said first transfer panel is adapted to push a stack of packages from said stacking region to said transfer region;
   means for stacking packages at said stacking region;
   a second transfer panel aligned with said first transfer panel, said second transfer panel normally disposed at a side of said transfer region opposite said stacking region;
   means for advancing said second transfer panel across said transfer region to said stacking region and for simultaneously advancing said first transfer panel and retracting said second transfer panel;
   a support panel and a pusher panel generally normal thereto laterally movably mounted on said frame, said support panel and said pusher panel having a retracted position disposed at said transfer region and an advanced position disposed at said storage region, said support panel having an unloading position in which said support panel slopes downwardly from said pusher panel and a loaded position pivoted from said unloading position to at least a horizontal position;
   means for simultaneously advancing said support panel and said pusher panel, and for independently retracting said support panel and said pusher panel; and
   means for pivoting said support panel between said loaded and unloading positions, whereby a stack of packages supported on said support panel are moved to said storage region by the simultaneous advance of said pusher panel and said support panel, said support panel is pivoted to said unloading position and independently withdrawn so that said pusher panel forces the stack of packages off said support panel.

16. A loading device for stacked packages, comprising:
   a frame;
   a transfer region and a laterally aligned storage region;
   a stacking region laterally aligned with said transfer region generally normal to the alignment of said transfer region and said storage region;
   a first transfer panel mounted on said frame to be disposed at a side of said stacking region opposite said transfer region;
   means for advancing said first transfer panel toward said transfer region, whereby said first transfer panel is adapted to push a stack of packages from said stacking region to said transfer region;
   a second transfer panel aligned with said first transfer panel, said second transfer panel normally disposed at a side of said transfer region opposite said stacking region;
   means for advancing said second transfer panel across said transfer region to said stacking region and for simultaneously advancing said first transfer panel and retracting said second transfer panel;
   a support panel and a pusher panel generally normal thereto laterally movably mounted on said frame, said support panel and said pusher panel having a retracted position disposed at said transfer region and an advanced position disposed at said storage region, said support panel having an unloading position in which said support panel slopes downwardly from said pusher panel and a loaded position pivoted from said unloading position to at least a horizontal position;
   means for simultaneously advancing said support panel and said pusher panel, and for independently retracting said support panel and said pusher panel; and
   means for pivoting said support panel between said loaded and unloading positions, whereby a stack of packages supported on said support panel are moved to said storage region by the simultaneously advance of said pusher panel and said support panel, said support panel is pivoted to said unloading position and independently withdrawn so that said pusher panel forces the stack of packages off said support panel.

17. A loading device for a stack of packages, comprising:
   a frame;
   a stack region, a transfer region laterally aligned therewith, and a storage region, said storage region laterally aligned with said transfer region generally normal to the lateral alignment of said stack region and said transfer region;
   a first generally vertical transfer plate and a second generally vertical transfer plate aligned therewith, said first transfer plate having a retracted position at a side of said stack region opposite said transfer region and an advanced position, and said second transfer plate having a retracted position at a side of said transfer region opposite said stack region and an advanced position;
   means for independently advancing said second transfer plate across said transfer region to said stack region, for simultaneously retracting said second transfer plate and advancing said first transfer plate across said stack region to said transfer region, and for independently retracting said first transfer plate;
   a pusher panel and a support panel generally normal thereto laterally movably mounted on said frame, said pusher panel and said support panel having a retracted position disposed at said transfer region and an advanced position disposed at said storage region; and means for simultaneously advancing said pusher panel and said support panel from said transfer region to said storage region and for independently retracting said support panel and said pusher panel, whereby a stack of packages are shifted by said cransfer plates from said stack region to said support panel and said pusher panel at said transfer region, and then shifted by said support panel and said pusher panel to said storage region, said support panel retracting independently so that said pusher panel forces a stack of packages off said support panel.

18. A loading device as defined in claim 17, further comprising means for raising and lowering said support panel and said pusher panel.

19. The loading device of claim 18, wherein: said simultaneously advancing and independently retracting means selectively advances said support panel and said pusher panel from said retracted position to at least two laterally spaced unloading positions, and selectively retracts said support panel and said pusher panel therefrom.

20. The loading device of claim 19, further comprising:
a pair of spaced guide panels projecting from said frame along opposite sides of said storage region, said guide panels adapted for receipt in a shelved storage unit and disposed to provide abutting side guide walls for stacked packages on said support panel.

21. The loading device of claim 20, further comprising:
means for pivoting said support plate from a loaded position toward a downwardly sloping unloading position.

22. The loading device of claim 17, further comprising:
means for pivoting said support plate from a loaded position toward a downwardly sloping unloading position.

23. The loading device of claim 21, wherein: said pivoting means simultaneously pivots said pusher panel with said support panel.

24. The loading device of claim 23, further comprising:
a gate mechanism disposed between said stack region and said transfer region, said gate mechanism having a closed position blocking the passage of packages from said stack region to said transfer region and an open position providing for the passage of packages therethrough.

25. The loading device of claim 24, wherein: said gate mechanism includes at least one generally vertical bar and means for raising and lowering said vertical bar.

26. The loading device of claim 18, wherein: said raising and lowering means includes a carriage vertically movably mounted on said frame; and a pivoting base pivotally mounted on said carriage, said pusher panel and said support member coupled to said pivoting base.

27. The loading device of claim 17, wherein: said simultaneously advancing and independently retracting means selectively advances said support panel and said pusher panel from said retracted position to at least two laterally spaced unloading positions, and selectively retracts said support panel and said pusher panel therefrom.

28. The loading device of claim 22, wherein: said pivoting means simultaneously pivots said pusher panel with said support panel.

29. The loading device of claim 17, further comprising:
a gate mechanism disposed between said stack region and said transfer region, said gate mechanism having a closed position blocking the passage of packages from said stack region to said transfer region and an open position providing for the passage of packages therethrough.

30. The loading device of claim 29, wherein: said gate mechanism includes at least one generally vertical bar and means for raising and lowering said vertical bar.

31. The loading device of claim 30, wherein: said bar raising means includes a hydraulic cylinder.

32. A method of transferring egg cartons, comprising:
providing a loading support panel and a loading pusher panel generally normal thereto;
moving a stack of egg cartons onto said loading support panel;
providing an egg storage cart having a storage surface thereon;
advancing said loading support panel and said loading pusher panel over said cart storage surface;
substantially maintaining the position of said loading pusher panel while retracting said loading support panel to deposit the stack of egg cartons on said cart storage surface;
said loading support panel retracting step including first pivoting said loading support panel to slope downwardly away from said loading pusher panel and thereafter retracting said loading support panel.

33. The method of claim 32, wherein:
said egg carton stack moving step includes providing a stack of egg cartons to one side of said loading support panel, providing a first upright panel closely adjacent a side of said egg carton stack opposite said loading support panel, providing a second upright panel at a side of said loading support panel opposite said egg carton stack, advancing said second upright panel across said loading support panel to said egg carton stack; and simultaneously shifting said upright panels to thereby shift said egg carton stack onto said loading support panel.

* * * * *

UNITED STATES PATENT AND TRADEMARK OFFICE
CERTIFICATE OF CORRECTION

PATENT NO. : 4,995,785

DATED : February 26, 1991

INVENTOR(S) : Kornelis Platteschorre

It is certified that error appears in the above-identified patent and that said Letters Patent is hereby corrected as shown below:

Column 1, Line 36
    After "transfer" insert --.--

Column 4, Line 4
    After "FIGS. 8-10" insert --.--

Column 6, Line 1
    After "cylinder" (second occurrence) insert --.--

Column 6, Line 56
    "stack a" should be --stack as--

Column 8, Line 12
    After "panel" insert --260--

Column 10, Line 31
    "assembly 1B" should be --assembly 18--

Signed and Sealed this

Fifteenth Day of September, 1992

*Attest:*

DOUGLAS B. COMER

*Attesting Officer*      *Acting Commissioner of Patents and Trademarks*